United States Patent [19]

Lovness

[11] 4,032,318

[45] June 28, 1977

[54] COMPOSTING MIXTURE

[75] Inventor: Donald E. Lovness, Stillwater, Minn.

[73] Assignee: Judd Ringer Corporation, Eden Prairie, Minn.

[22] Filed: July 7, 1975

[21] Appl. No.: 593,472

Related U.S. Application Data

[63] Continuation-in-part of Ser. No. 391,074, Aug. 24, 1973, abandoned.

[52] U.S. Cl. .......................................... 71/9; 71/10; 71/64 JC; 195/52; 195/53
[51] Int. Cl.$^2$ ............................................ C05F 9/04
[58] Field of Search .................. 195/52, 53, 55, 56, 195/90, 91, 92, 79, 59, 99, 100, 101, 102, 103, 34, 111, 113, 114, 65, 112; 210/2, 11, 16; 71/8, 9, 10, 64 JC

[56] References Cited

UNITED STATES PATENTS

| | | | |
|---|---|---|---|
| 947,798 | 2/1910 | Coates | 195/102 |
| 1,368,249 | 2/1921 | Ducommon | 195/59 |
| 1,515,016 | 11/1924 | Earp-Thomas | 195/100 |
| 2,452,534 | 11/1948 | Jeffreys | 195/90 |
| 3,242,055 | 3/1966 | Lucia | 210/11 |
| 3,269,940 | 8/1966 | Attaway | 71/10 |
| 3,890,129 | 6/1975 | Chester | 71/9 |
| 3,934,999 | 1/1976 | Meier | 71/9 |

FOREIGN PATENTS OR APPLICATIONS

| | | | |
|---|---|---|---|
| 1,301,974 | 7/1962 | France | 71/9 |
| 2,142,883 | 3/1973 | France | 71/9 |

*Primary Examiner*—Raymond N. Jones
*Assistant Examiner*—Thomas G. Wiseman
*Attorney, Agent, or Firm*—Frederick E. Lange

[57] ABSTRACT

A composting mixture for facilitating the rapid decomposition of organic material to be composted in which there is a relatively small amount of various microorganisms for digesting the material, a relatively small amount of enzymes for breaking down the cell structure of the organic material to enable it to be digested by the microorganisms, and a relatively large amount of materials rich in proteins and carbohydrates to facilitate the rapid reproduction of the microorganisms prior to the time that the enzymes have broken down the cell structure of the organic material. The materials rich in protein and carbohydrates are so selected as to provide a ratio of one to from three to four parts of protein by weight to carbohydrate. This simulates the ratio of protein to carbohydrate in growing vegetable matter and enables initial rapid reproduction of the microorganisms. The enzymes include a hemicellulase, a cellulase, a protease, an amylase and lipase. The microorganisms include both aerobic and anaerobic bacteria. The materials rich in proteins and carbohydrates can include varying proportions of a high-protein flour such as one made from durum wheat, Torula yeast, cornstarch and blood meal.

9 Claims, No Drawings

COMPOSTING MIXTURE

This application is a continuation-in-part of the co-pending application of the applicant Ser. No. 391,074, filed Aug. 24, 1973 now abandoned.

BACKGROUND OF THE INVENTION

There has been an increasing recognition in recent years of the desirability of composting organic matter rather than discarding the same. Organic matter when properly composted provides rich humus for the soil. The desirability of composting material has long been recognized. It has also long been recognized that the composting action is facilitated by the addition of microorganisms and enzymes. Such microorganisms and bacteria tend to be present naturally in piles of organic material, particularly if soil is added to the organic material. The amount and type of such microorganisms present in soil and in organic material to be composted is, however, somewhat uncertain and there may be a long period of time between the initial accumulation of the organic material and the presence of any substantial amount of decomposition of the material being composted. In the meantime, undesirable odors can be produced in the material to be composted. For this reason, it has been proposed to add selected bacteria and enzymes to accelerate the composting action. This enables the introduction of the proper microorganisms at the start.

The drawback to the use merely of microorganisms and enzymes is that the initial composting action is still rather slow. This is due to the fact that the bacteria cannot digest the organic material until the cellular structure of the organic material has been broken down by the action of enzymes which break down the protein membranes covering the cells. Hence, until the enzymes have completed their action in breaking down all cell structure to release the protein and carbohydrates, the action of the microorganisms is relatively limited and their initial reproduction rate is relatively low.

SUMMARY OF THE INVENTION

The present invention is concerned with a composting mixture including not only microorganisms and enzymes but also a substantial quantity of materials rich in protein and carbohydrates. This enables the microorganisms to digest the proteins and carbohydrates and to reproduce rapidly. At the same time, the microorganisms are producing further enzymes which, with the enzymes originally present, attack the cell structure of the organic material by breaking down the protein membranes covering the cells. The result of the rapid reproduction of the microorganisms is that as the enzymes complete their action in breaking down the cellular structure, there is a large amount of microorganisms ready to digest the protein and carbohydrates released by the action of the enzymes and a large amount of enzymes available to aid the microorganisms as catalysts.

Materials rich in protein and carbohydrates are preferably selected to that there is a ratio of one to from three to four parts of protein, by weight, to carbohydrate. This simulates the ratio of protein to carbohydrate in growing vegetable material and is desirable for rapid reproduction of the microorganisms. Furthermore, since the protein and carbohydrates are present in amounts similar to those present in the material to be decomposed, the microorganisms and enzymes that will multiply will be those best adapted to digest the material to be decomposed.

Other objects and features of the invention will be apparent from a consideration of the accompanying specification and claims.

DESCRIPTION OF THE PREFERRED EMBODIMENT

As pointed out above, my improved composting mixture includes a relatively small amount of certain selected microorganisms, a relatively small amount of enzymes and a relatively large amount of materials rich in proteins and carbohydrates. Some of the microorganisms are selected by extracting the same from composting piles in which there has been rapid decomposition of the material being composted. The extracted material is then used to innoculate other organic material and the process is repeated until this has resulted in adequate amounts of material rich in microorganisms of types which have demonstrated a high degree of effectiveness. The desired enzymes, which have been laboratory grown, are added to these microorganisms. My mixture preferably comprises about five percent of such microorganisms and enzymes, which, of course, is at least a million times the ratio of microorganisms and enzymes inherently present in organic material to be composted. The bacteria should include both aerobic bacteria and anaerobic bacteria. A typical anaerobic bacteria is clostridium. This aids in a symbiotic nitrogen fixation. Other bacteria having this function are azotobacter which has an anaerobic function at a pH of about six and beijerinckia which has an aerobic function at a pH of as low as three. Other desirable bacteria are nitrosomonas and nitrobacter types and aspergillus flavus. In addition, it is desirable to have other microorganisms such as certain molds. Basically, the bacteria tends to be dominated by arthrobacter, clostridium, achromobacter, bacillus and actinomycetes types. In general, the microorganisms are selected to have the property, among others, of producing large amounts of additional enzymes of the type initially included in the mixture. In a typical mixture in which, as stated above, the microorganisms and enzymes will comprise about five percent of the mixture, the microorganisms and enzymes will include about 70% of enzymes, 20% of fungi, and 10% of bacteria.

Typical enzymes that have been found desirable and which are initially present in the mixture are hemicellulase, cellulose, protease, amylase and lipase enzymes. Another desirable enzyme is phenyl oxygenase. This enzyme is effective in splitting the aromatic flavone in leaves to aid in their cell structure being broken down.

Among materials which can be used to produce a mixture high in carbohydrates and proteins are a mixture of pregelatinized durum wheat flour, cornstarch and Torula yeast. Pregelatinized durum wheat flour has 16 to 18 percent protein and 65 percent carbohydrate. Because it is pregelatinized, it is preconditioned so that the bacteria can readily digest the flour despite its cellular structure. Torula yeast has a 50 percent protein content. Fourteen percent of this protein content is in the form of available nitrogen. Furthermore, some of the yeast also acts as a source of microorganisms. The cornstarch has 85 percent carbohydrate. A typical mixture contains 45 percent pregelatinized durum wheat flour, 25 percent cornstarch and 25 percent Torula yeast.

In some cases, I have found it desirable to employ blood meal. This has about 85 percent protein. In such case, the amounts of protein flour and Torula yeast can be substantially reduced. In a typical mixture, I have employed 20 percent blood meal.

In the mixtures described above, the materials are selected on the basis of their protein and carbohydrate content to give a ratio of protein to carbohydrate of one to from three to four parts by weight. As pointed out above, this is the ratio of protein to carbohydrate naturally occurring in growing vegetable material. Certain of the microorganisms utilize protein and others utilize carbohydrate. Among the microorganisms utilizing carbohydrates are the fungus types occurring in molds and certain thermophyllic bacteria. Furthermore, it is highly desirable that both types of substance be present. The effect of the bacteria digesting the proteins with the aid of the enzymes acting as catalysts is to produce a nitrogen by-product which is in turn desirable for reproduction of the microorganisms. The digestion of the carbohydrates results in the generation of heat which is highly desirable in the composting action. In the first place, the production of the relatively high temperatures that can occur from the reaction of the bacteria on the carbohydrates tends to destroy any weed seeds that might be present in the material being composted. Furthermore, the heat tends to destroy any pathogens that might be present. In some cases, temperatures as high as 170° F. have been recorded within 48 hours of the addition of the composting mixture to the material being composted. As the temperature changes in the material, certain microorganisms which have been dormant become active and others cease activity.

In use, about 50 pounds of the composting mixture are mixed with 1,000 gallons of water. The material to be composted is placed in large windrows, preferably 8 to 10 feet high on a base about 10 feet wide. The mixture of water and the composting material is applied until the water starts running off. The piles are then left for at least 48 hours. By this time, the enzymes will have substantially broken down the cell structure. The material to be composted will now readily absorb water and water should again be added. About ten times as much water can be added as was added originally. Water should be added from time to time to keep the pile always damp. It is desirable also to agitate the material occasionally to admit oxygen unless the pile is sufficiently small to permit the access of oxygen to the interior from the sides or top of the pile. The oxygen is necessary to support the action of the aerobic bacteria. When the amount of available oxygen is reduced too much, the only action available is the anaerobic action and this results in gaseous by-products having undesirable odors.

The composting mixture of the present invention will, when added to organic material with an adequate amount of water, result in rapid decomposition of the material. Because of the presence of the materials rich in protein and carbohydrate, it is possible to decompose the material being composted quite rapidly as compared with prior materials in which the added microorganisms had to remain relatively dormant until the enzymes had been able to break down the cellular structure of the organic material.

While I have described certain specific embodiments of my invention, it is to be understood that the scope of my invention is to be limited solely by the appended claims.

I claim as my invention:

1. A method of facilitating the rapid decomposition of organic matter to be composted, said method comprising:

preparing a mixture of a quantity of microorganisms for digesting the organic material, said microorganisms including both aerobic and anaerobic bacteria, and a quantity of enzymes for breaking down the cell structure of the organic material to enable it to be digested by the microorganisms which is many times that which is inherently otherwise present in organic material to be composted, including in said mixture a quantity of materials rich in proteins and carbohydrates which quantity is many times the combined quantities of microorganisms and enzymes, said materials being in a proportion to provide a ratio of one to from three to four parts of protein by weight to carbohydrate to facilitate the rapid reproduction of the microorganisms prior to the time that the enzymes have broken down the cell structure of the organic material, adding said mixture to the material to be composted, and periodically adding water to the material being composted.

2. The method of claim 1 in which the organic material being composted is agitated from time to time to admit oxygen to the material.

3. The method of claim 1 in which the enzymes include a hemicellulase, a cellulase, a protease, an amylase, and lipase.

4. The method of claim 1 in which the materials rich in proteins and carbohydrates include durum wheat flour.

5. The method of claim 1 in which the materials rich in proteins and carbohydrates include Torula yeast and starch.

6. The method of claim 1 in which the materials rich in proteins and carbohydrates include blood meal and starch.

7. The method of claim 1 in which the microorganisms have the property of rapidly producing enzymes in addition to those originally present in the mixture.

8. The method of claim 1 in which the microorganisms and enzymes together constitute about 5 percent of the mixture.

9. The method of claim 1 in which the microorganisms are in a class consisting of arthrobacter, clostridium, achromobacter, bacillus and actinomycetes types.

* * * * *